United States Patent
Alla

(10) Patent No.: US 11,368,113 B2
(45) Date of Patent: Jun. 21, 2022

(54) BREAKER FAILURE PROTECTION USING REVERSE ACTIVE POWER AND NEGATIVE REACTIVE POWER ELEMENT

(71) Applicant: Schweitzer Engineering Laboratories, Inc., Pullman, WA (US)

(72) Inventor: Matchyaraju Alla, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 258 days.

(21) Appl. No.: 16/717,438

(22) Filed: Dec. 17, 2019

(65) Prior Publication Data

US 2021/0184607 A1    Jun. 17, 2021

(51) Int. Cl.
*H02P 9/02* (2006.01)
*H02P 9/10* (2006.01)
*H02P 27/00* (2006.01)
*H02P 9/00* (2006.01)

(52) U.S. Cl.
CPC .............. *H02P 9/006* (2013.01); *H02P 9/02* (2013.01)

(58) Field of Classification Search
CPC .................................. H02H 7/06; H02P 3/04
See application file for complete search history.

(56) References Cited

U.S. PATENT DOCUMENTS

| 9,620,994 B2 * | 4/2017 | Bhavaraju | H02J 3/381 |
| 2011/0062708 A1 * | 3/2011 | Prochaska | F02D 29/06 290/7 |
| 2015/0123623 A1 * | 5/2015 | Gulen | H02P 9/14 322/20 |

OTHER PUBLICATIONS

Greg Hataway, Jonathan Ellison, Michael Thompson "Improving Breaker Failure Protection for Generator Applications" Presented at the 38th Annual Western Protective Relay Conference Oct. 2011.
Christopher Dall, Dennis Tierney "Generator Breaker Failure Applications" Presented at Doble Engineering Company 2014 International Conference of Doble Clients, 2014.
IEEE Standards Association "IEEE Guide for Breaker Failure Protection of Power Circuit Breakers" IEEE StdC37.119-2016, Jul. 2016.

* cited by examiner

*Primary Examiner* — Muhammad S Islam
*Assistant Examiner* — Charles S Laughlin
(74) *Attorney, Agent, or Firm* — Fletcher Yoder, P.C.

(57) ABSTRACT

A generator system includes a generator including terminals, a generator circuit breaker coupled to the terminals and that couples and decouples the generator from a power grid, multiple sensors, and a controller that operates the generator system. The controller determines whether an active power is less than a reverse active power threshold and whether one or more turbine valves are closed, and determines that a breaker failure has occurred based on the active power being less than the reverse active power threshold and the one or more turbine valves being closed. If the active power remains less than the reverse active power and the turbine valves remain closed after a threshold time period after the trip command, and if a reactive power is less than a reverse reactive power threshold, then a breaker failure has occurred. In response, the controller may transmit another trip command to the generator circuit breaker to initiate the breaker failure protection.

20 Claims, 3 Drawing Sheets

Figure 1:
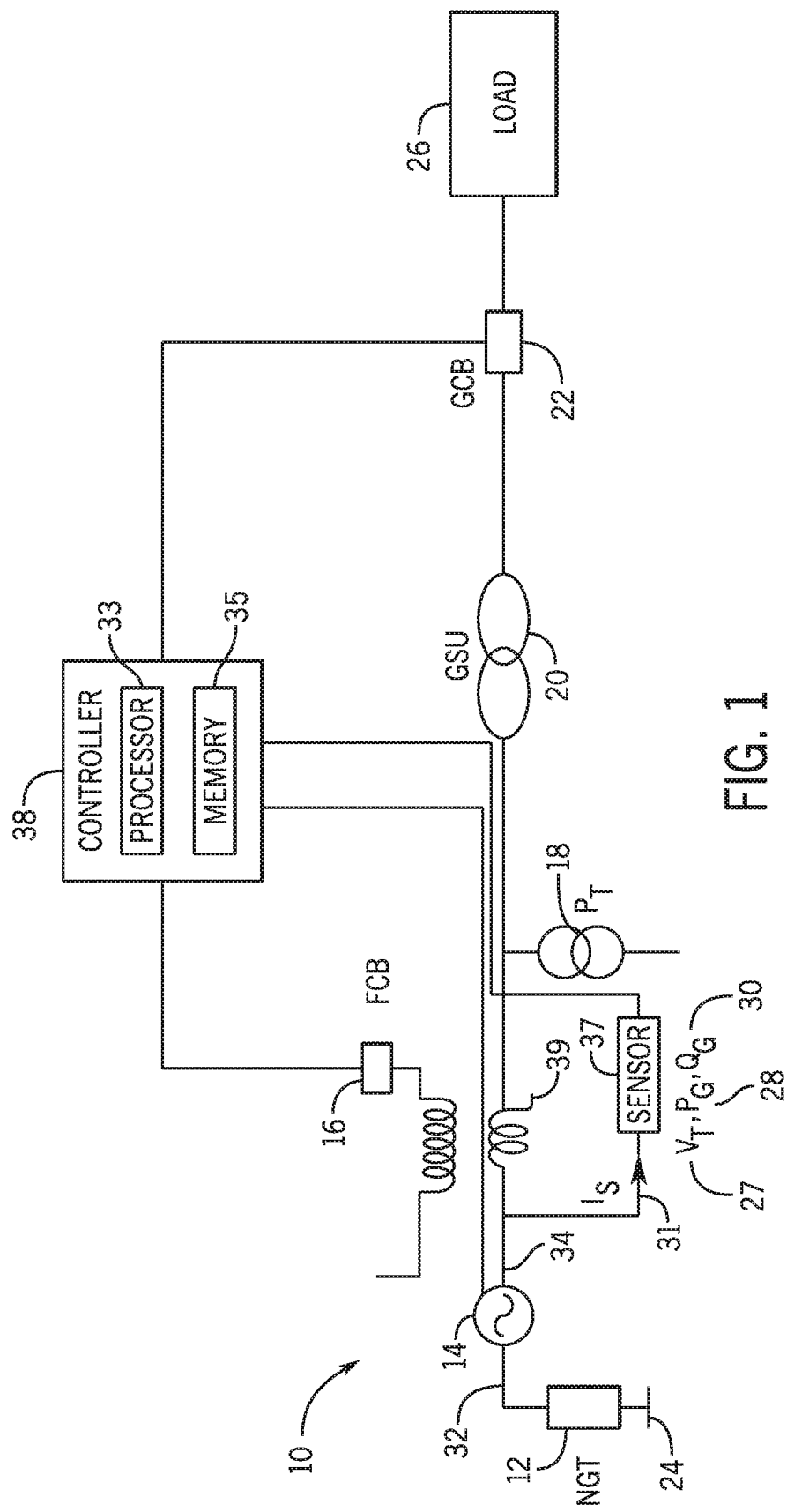

BREAKER FAILURE PROTECTION USING REVERSE ACTIVE POWER AND NEGATIVE REACTIVE POWER ELEMENT

BACKGROUND

The present disclosure relates generally to the field of failure protection for electrical generators. More specifically, the present disclosure relates to detecting a failure of a generator circuit breaker to open without relying on a generator circuit breaker status indicator.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electrical generators convert mechanical energy into electrical energy to power a load (e.g., an electrical device). For example, a mechanical force may move a turbine or rotary device to excite electrons and induce an electrical current. In some instances, such as a fault condition caused by an overvoltage or overcurrent to the generator, the generator may be "tripped" or shut off to prevent damage to the system. A circuit breaker may be used to interrupt the current flow, thereby tripping the generator, after the fault is detected. Specifically, the circuit breaker may disconnect the generator from the load being supplied with electricity by the generator when a fault is detected. If the circuit breaker fails to open, breaker failure protection systems may be implemented. Unfortunately, breaker failure systems may not accurately detect breaker failure for certain low-current fault conditions, potentially resulting in unintended operation of or damage to the generator system.

BRIEF DESCRIPTION

Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

In accordance with an example, a generator system includes a generator, a generator circuit breaker that selectively couples and decouples the generator from a power grid, multiple sensors, and a controller that operates the generator system. The controller determines whether an active power is less than a reverse active power threshold and whether one or more turbine valves are closed. In response to the active power being less than the reverse active power threshold and the one or more turbine valves being closed, the controller may simultaneously provide a trip command to a generator circuit breaker and a field circuit breaker. However, if the active power remains less than the reverse active power threshold and the one or more turbine valves remains closed after a threshold time period after the trip command, and if a reactive power is less than a reverse reactive power threshold, then the controller may determine that a breaker failure has occurred. In response, the controller may transmit another trip command (e.g., retrip) to the generator circuit breaker.

In accordance with an example, a method for operating a generator in a generator system includes determining whether an active power is less than a reverse active power threshold and determining whether one or more turbine valves are closed. In response to the active power being less than the reverse active power threshold and the one or more turbine valves being closed, the method includes simultaneously transmitting a trip command to a generator circuit breaker and a field circuit breaker. The method also includes determining that a breaker failure has occurred based at least in part on the active power being less than the reverse active power threshold, the one or more turbine valves being closed, and a reactive power being less a reverse reactive power threshold. Further, the method includes transmitting another trip command to a generator circuit in response to determining that a breaker failure has occurred after an initial trip command to the generator circuit breaker and the field circuit breaker.

In accordance with an example, a tangible, non-transitory, computer-readable medium stores instructions executable by one or more processors of a generator system. The instructions cause the one or more processors to operate the generator system, determine whether an active power ($P_G$) is less than a reverse active power ($P_{REV}$) threshold, determine whether one or more turbine valves are closed, and determine whether the active power is less than 0 W. Additionally, the instructions cause the one or more processors to determine that a breaker failure has occurred based at least in part on the active power being less than the reverse active power threshold and the one or more turbine valves being closed. Further, in response to the one or more turbine valves being closed and the active power being less than 0 W, the instructions cause the one or more processors to determine whether a reactive power ($Q_G$) is less than a reverse reactive power threshold ($Q_{REV}$), $$\left[ C * \frac{V_t^2}{X_d} \right],$$

where C is a coefficient ranging from 0.1-0.5, $V_t^2$ is a terminal voltage for the generator, and $X_d$ is a direct axis synchronous reactance. In response to the active power being less than the reverse active power threshold, the one or more turbine valves being closed, the active power being less than 0 W, and the reactive power being less than the reverse reactive power threshold, the instructions cause the one or more processors to transmit a retrip command to a generator circuit breaker or initiates a standard breaker failure.

DRAWINGS

Figure 2:
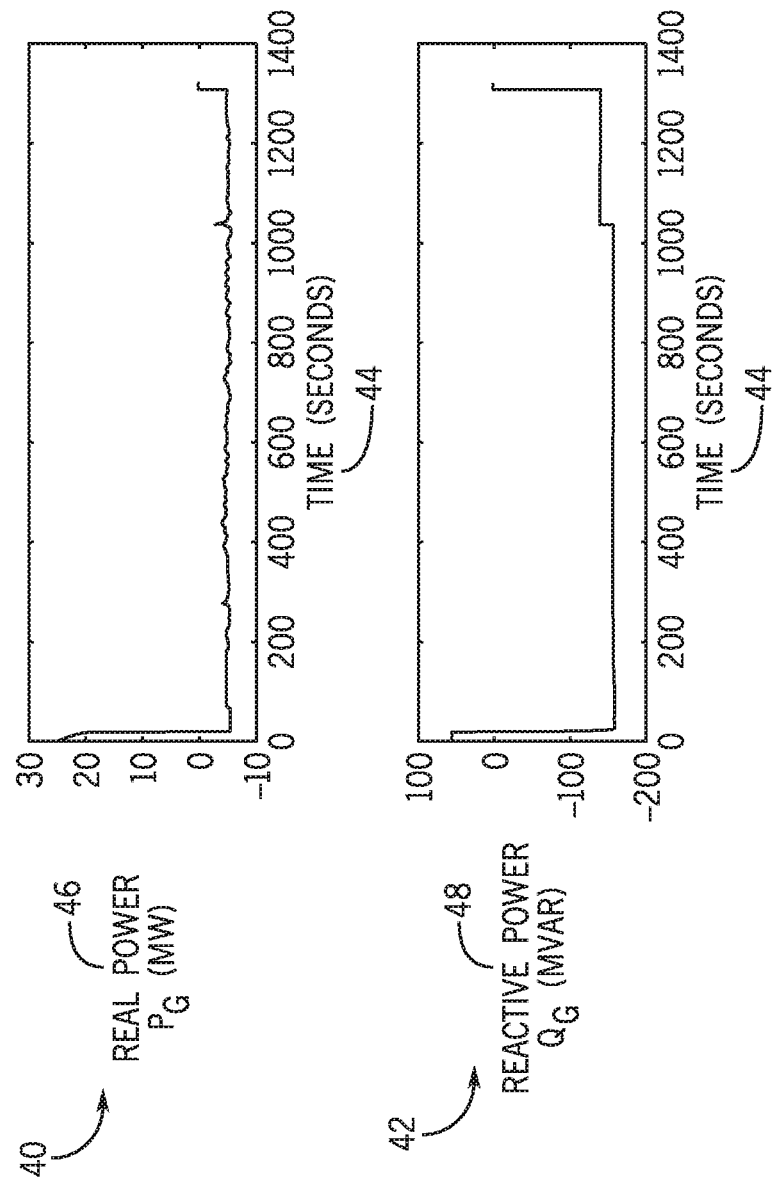
Figure 3:
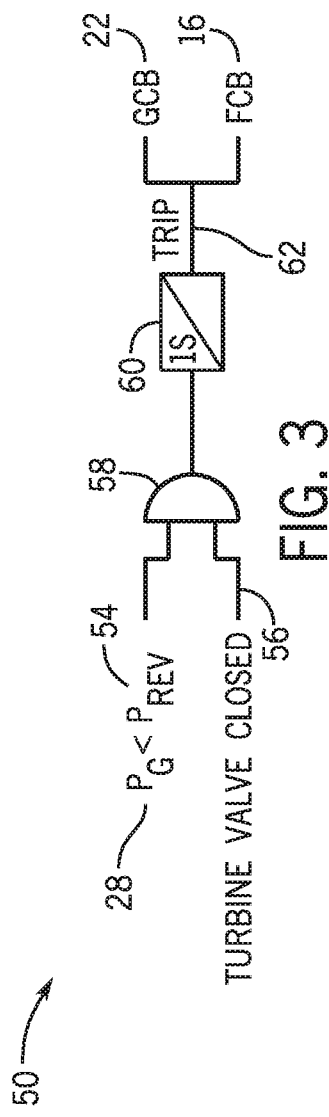
Figure 4:
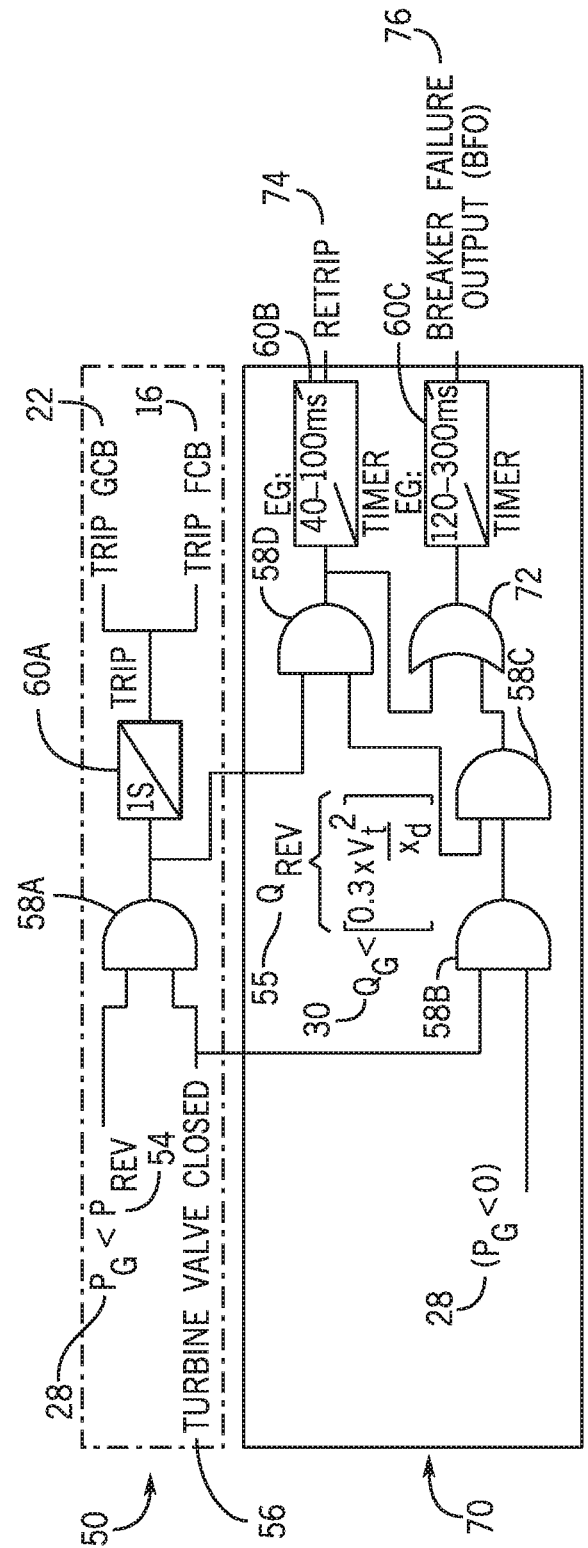

These and other features, aspects, and advantages of the present disclosure will become better understood when the following detailed description is read with reference to the accompanying drawings in which like characters represent like parts throughout the drawings, wherein:

FIG. 1 is a circuit diagram of a generator circuit breaker system, in accordance with an embodiment;

FIG. 2 provides graphs illustrating a generator operating as an induction motor due to a breaker failure, in accordance with an embodiment;

FIG. 3 is a logic diagram of a sequential trip operation with a breaker failure protection using a reverse active power element and a turbine valve closed indication, in accordance with an embodiment; and FIG. 4 is a logic diagram of the sequential trip operation of FIG. 3 with an additional logic path for when a generator pole fails to open, in accordance with an embodiment.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, generators convert mechanical energy, such as energy from steam turbines, gas turbines, water turbines, internal combustion engines, wind turbines, and so forth, into electrical energy that is used to power a load. However, a fault condition may occur, causing the generator to act in an unintended manner. Fault conditions may include internal faults or abnormal operating conditions. For example, internal faults may include stator winding faults, field winding fault, or rotor circuit faults. Abnormal operating conditions may include a failure of the turbine, failure of field, overloading, over-voltage at generator terminals, over-speed, or current leakage. Overloading is a common abnormal operating condition and occurs when the load is subjected to current above its capacity and/or when the current causes excessive heat. To protect against fault conditions, a generator circuit breaker may be used to disconnect the generator from the load in order to prevent damage that would otherwise be caused to the components in the generator system, the load, or both.

In some instances, the generator circuit breaker may fail to open, and detecting such breaker failures may be difficult in systems generating low currents, such as a current less than 10% of a rated current of a current transformer. Generally, normal shutdown of the generator system may include a sequence or series of events, such that one event related to one component directly impacts the next event related to another component, and detecting the failure of the generator circuit breaker to not open properly may be important to prevent or reduce damage to multiple components. In the event of a fault and the generator circuit breaker failing to open, the generator may draw power from a grid and use the power to drive the generator as an induction motor. Extended operation of the generator for an extended time period (e.g., 20 minutes), may be expensive and/or potentially cause damage to the rotor and/or turbine components since a shutdown sequence was not properly completed.

Many breaker failure detection schemes depend on either a mechanical detection and/or an electrical detection to determine the state of the breaker. A breaker failure detection scheme using a mechanical detection for the breaker status may rely on a physical status of contacts. The contacts may include 52a auxiliary contacts that follow an action of breaker contacts, such as by way of a cam that is physically linked to the generator circuit breaker. Thus, the breaker failure may involve a failure of the mechanism to move the contacts apart to open the connection even while the auxiliary cam may move normally. In applications where sufficient current may not be present or measurable, mechanical detection may be used alone or in conjunction with other detection mechanisms to detect the breaker failure. Depending on the application type and measurable current (e.g., above some threshold of measurability), electrical detection may be also be used.

Breaker failure schemes with electrical detection may involve a timer and a current element to detect the presence of a current above a set threshold. Current detection using the current element may facilitate current monitoring during the timing process or upon the expiration of the timer and the subsequent current output. Depending on the measured current (e.g., at the expiration of the timer) during the current monitoring, the current detection may indicate that the breaker has not opened or successfully interrupted the current. The current element used to detect the presence of the current may be set above a threshold. The threshold may be a value indicative of a fault in the primary zone of protection and above the current for the load. Detection of the current may be performed during a timer running and/or after the timer has expired depending on system configurations and/or time criticality of possible errors Additionally or alternatively to the mechanical and/or electrical breaker failure detection, breaker failure schemes may rely on a breaker status indicator. For example, some generator tripping schemes use a breaker status via the breaker status indicator in parallel with an overcurrent indication via the current element to trip based on both the breaker status and the overcurrent status. While this scheme may allow additional dependability to accurately detect a breaker failure, such as for the combination of overcurrent along with a closed breaker status, this scheme may not provide adequate protection for other types of fault conditions. In particular, this scheme may not provide accurate detection when the current output is very low (e.g., below a threshold or less than 10% of a rated current of a current transformer). The low current output may continue to power one or more circuits but the overcurrent element may not detect this output. As such, the overcurrent element may falsely indicate that the generator circuit breaker is open when it is still closed. Thus, a breaker failure scheme that detects a breaker failure following a breaker open command without relying on the breaker status indicator may provide an accurate and reliable indication of the actual breaker status.

Briefly, to illustrate the general configuration of a generator system, FIG. 1 illustrates a circuit diagram of a generator system 10. The generator system 10 may be grounded to limit phase-to-ground fault currents. This limited phase-to-ground fault current may also allow detection of unwanted connection between system components and ground (e.g., a ground fault) by detecting the current flow. Methods of grounding the generator system 10 may include low resistance grounding (LRG) or high resistance grounding (HRG), but the generator system 10 may also be effectively grounded, reactance grounded, or ungrounded. In the depicted embodiment of the generator system 10, the system is arranged in a resistance grounding arrangement (e.g., high resistance grounding arrangement).

As shown, the generator system 10 generally includes a neutral grounding transformer (NGT) 12, a generator 14, a field circuit breaker (FCB) 16, a potential transformer (PT) 18, a generator step-up transformer (GSU) 20, a generator circuit breaker (GCB) 22, a load 26, a controller 38, and a current transformer (CT) 39. These components support the generator 14 to supply energy to the load 26. In a resistance grounding system, a neutral connection on the generator 14 or transformer 18 is connected to Earth (0 V) through a fixed resistance (e.g., the neutral grounding transformer 12) to limit the earth fault current. For example, the neutral grounding transformer 12 is connected to ground 24 to ground the generator 14 via the neutral grounding transformer 12. When a ground fault occurs, the magnitude of the ground fault is restricted by the neutral grounding transformer 12.

In some embodiments, the resistance grounded generator system 10 may include (e.g., one, two, three, etc.) current transformers (CTs) 39 on the neutral side 32 of the generator 14 and/or one or more current transformers on the terminal side 34 of the generator 14. Here, the current transformers 39 are positioned on the terminal side 34 of the generator 14. One or more sensors 37 may determine active power 28 ($P_G$) and reactive power 30 ($Q_G$) using a sensor current 31 ($I_s$) measured by the one or more sensors 37. The reactive power 30 may refer to power that is absorbed by the generator system 10. A terminal voltage ($V_T$) 27 may also be determined via the one or more sensors 37. The one or more sensors 37 may be located at the neutral side 32. Additionally or alternatively, and as shown, the one or more sensors 37 may be located at the terminal side 34 of the generator 14. Accordingly, the active power 28, reactive power 30, and a generator terminal voltage 27 may be calculated from the terminal side 34 using the sensor current 31 generated by the current transformer 39 based on current flowing though the current transformer 39. As will be discussed in detail in FIGS. 3 and 4, these measurements may be used in calculations to detect faults, such as single phasing fault in the generator 14. Specifically, the measurements may be sent to the controller 38, which may be programmed to determine calculations and/or correspondingly operate the generator system 10.

The controller 38 may include a microprocessor 33, a non-volatile memory 35, and in some instances, a user interface. The microprocessor 33 may include any suitable type of processing circuitry, such as one or more processors, one or more "general-purpose" microprocessors, one or more special-purpose microprocessors, and/or one or more application specific integrated circuits (ASICs), or some combination thereof. For example, the microprocessor 33 may include one or more reduced instruction set (RISC) processors. The microprocessor 33 may process instructions stored in the memory 35 to determine failure of the generator circuit breaker 22 to open without relying on a generator circuit breaker status indicator from auxiliary contacts from the generator circuit breaker 22, using the techniques described herein. Subsequently, the controller 38 may issue a backup trip command, as will be discussed in detail with reference to FIG. 3 and FIG. 4.

The memory 35 of the controller 38 may store instructions, data, and/or information, such as an algorithm used for detecting or receiving via the sensors 37 a status indicator of a breaker (e.g., field circuit breaker 16 and/or generator circuit breaker 22), receiving measurements of or data related to the active power 28 and reactive power 30, commanding components to actuate (e.g., switch on or off) based on detected or determined power measurements and sensor data, and so forth. The memory 35 may be a tangible, non-transitory, computer-readable medium that stores sensor data and/or instructions executable by the microprocessor 33. Thus, in some embodiments, the memory 35 may include random access memory (RAM), read only memory (ROM), rewritable non-volatile memory, flash memory, hard drives, optical discs, and the like.

Furthermore, in some embodiments, the controller 38 may be communicatively coupled to and/or include a user interface that provides information to and/or receives information from a user (e.g., operator). In some embodiments, the user may control or override the controller 38, such as to directly issue a trip command to the general circuit breaker 22. The user interface may include any suitable combination of input and output devices, such as an electronic display, a touchscreen, a stylus, a keypad, a button, and/or the like, to enable communicating system fault and/or system information to a user. Moreover, in some embodiments, the controller 38 may be communicatively coupled to and/or include a communication interface that may enable communication with any suitable communication network, such as wiring terminals, a cellular network, a Wi-Fi network, a personal area network (PAN), a local area network (LAN), a wide area network (WAN), and/or the like. For example, the communication interface may enable the controller 38 to communicate with a user interface implemented on a user's mobile device, which is also communicatively coupled to the communication network.

The controller 38 may be connected to the field circuit breaker 16, the generator circuit breaker 22, the generator 14, and/or the sensors 37. In general, the controller 38 and its components may be used to control and regulate the overall generator system 10 based on feedback from the sensors 37, from an operator, and so forth. For example, the controller 38 may command the generator circuit breaker 22 to switch to open upon determining a fault, which may be determined based on data provided by the sensors 37.

As previously discussed, upon detecting a fault, the controller 38 may issue a trip command to switch the generator circuit breaker 22 to off (e.g., switch open). In some instances, the generator circuit breaker 22 may fail to switch to off and, thus, the generator 14 may continue to be connected to a power grid (e.g., load 26). As such, the generator 14 may draw power from the power grid, which may drive the generator 14 as an induction motor. Operating the generator 14 as an induction motor in this way may be expensive (since the generator 14 is now consuming, rather than producing, electrical energy) and/or may potentially cause damage to the rotor and/or turbine components since a shutdown sequence was not properly completed. To mitigate power consumption and/or potential damage to the system 10 caused by the generator 14 acting an induction motor, the generator circuit breaker 22 may disconnect the generator 14 from the load 26, as discussed above. However, in some instances, the generator circuit breaker 22 may fail to open upon a breaker failure command (e.g., breaker failure initiation (BFI) signal).

To illustrate, FIG. 2 provides a first graph 40 and a second graph 42 depicting the generator 14 operating as an induction motor due to a breaker failure, which may occur without a signal indicating a reverse active power condition and open turbine valves, as will be described in detail with reference to FIG. 3. Reverse active power may refer to power flowing into the generator 14 rather than out of the generator. Each of these graphs 40 and 42 depict power production over time 44. Namely, the first graph 40 depicts real power produced over time in units of megawatts (MW) and the second graph 42 depicts reactive power produced over time in units of mega volt-ampere reactive (MVAR). Around time 0, the generator 14 may stop operating normally and the generator circuit breaker 22 may receive a trip command to turn off (e.g., switch open). In this example, however, the generator circuit breaker 22 may erroneously remain on (e.g., switch closed).

As a consequence, the generator 14 may begin to pull power from a power grid and may function as an induction motor. This is reflected in the graphs 40 and 42. In the first graph 40, the real power 46 produced (e.g., active power 28 ($P_G$) of FIG. 1) starts at approximately 25 megawatts (MW). Similarly, in the second graph 42, the reactive power 48 produced (e.g., reactive power 30 ($Q_G$) of FIG. 1) begins at about 50 mega volt-ampere reactive (MVAR). After the trip command occurring around time 0, the generator circuit breaker 22 may fail to open, and instead, may be partially open or disconnected from at least some of the circuit breaker contacts. In response, the real power 46 and the reactive power 48 may fall but still power the generator 14, such as to cause the generator 14 to operate as an induction motor. In the graphs 40 and 42 of FIG. 2, the generator 14 is shown to operate as an induction motor for 1260 seconds (21 minutes) before returning to normal operation. Over this time period, the graphs 40 and 42 show active and reactive power production to be negative, meaning that the generator 14 is consuming power, rather than producing it. This may be expensive and/or cause damage to components in the generator system 10.

However, other methods may be used to identify the breaker failure. For example, these other methods may rely on other signals, such as signals that indicate a reverse active power condition and open turbine valves as will be described in detail with reference to FIG. 3. These methods may be used to identify the breaker failure prior to the generator 14 operating as an induction motor. For example, using the breaker failure schemes described herein, the breaker failure may be detected within timer duration (seconds) and may be detected even before the generator 14 begins operation as an induction motor, which may be expensive and/or cause damage to components.

To prevent or mitigate such repercussions of failure, breaker failure schemes may be utilized. Since breaker failure schemes that rely on current detection after a time threshold to identify breaker failure may not operate properly at low currents, additional detection mechanisms, as disclosed by the present embodiments, may be utilized to reliably detect the breaker failure, especially for low currents (e.g., currents that are less than 10% of the rated current for the current transformer 39). By way of example, the generator 14 may be a large steam turbine generator, for which a chain of events may be made to occur when tripping to reduce possible damage or wear to the turbine system. As such, the generator 14 may be tripped when a protective relay detects a reverse active power condition, which is known as a sequential trip operation.

Briefly, FIG. 3 depicts a logic diagram of a sequential trip operation 50 with breaker failure protection using signals relating to a reverse active power condition (reverse active power 54) and whether turbine valve of the generator 14 is closed (closed turbine valve signal 56). FIG. 4 depicts the sequential trip operation 50 of FIG. 3 with an additional logic path 70 for breaker failure protection when a pole (i.e., a phase) of the generator 14 does not open. In some embodiments, the process and steps of the sequential trip operation 50 of FIG. 3 and FIG. 4, may be implemented at least in part by executing instructions stored in a tangible, non-transitory, computer-readable medium, such as the memory 35 of the controller 38, using processing circuitry, such as the microprocessor 33 of the controller 38. Accordingly, the sequential trip operation 50 of FIG. 3 and FIG. 4 may be performed or controlled at least partly by the controller 38.

Generally, the sequential trip operation 50 is used to ensure that the turbine valves have closed and that the turbine generator 14 is no longer driving the shaft after transmitting a trip command to the generator circuit breaker 22, preventing the turbine generator 14 from accelerating at excessive speeds after it is disconnected from the power system via the generator circuit breaker 22. If the generator circuit breaker 22 fails to open, the generator 14 may be subject to a motoring condition in which the generator 14 operates as an induction motor. As such, another trip command may be transmitted after an indication that the original trip command was transmitted and a breaker failure is detected.

Within the preceding in mind, FIG. 3 depicts a modified sequential trip operation 50 that may be used to identify and protect against a breaker failure. As indicated by the AND gate 58, the breaker failure protection in the sequential trip operation 50 may include detecting a positive or true output (e.g., logical 1) when two inputs are detected to be true, such that both conditions exist. Although the following descriptions describe a condition to be present by determining a logical high (e.g., 1), which represents a particular embodiment, the techniques described herein may be performed using other complementary form of signals in other logical states. For example, other logic schemes and/or logical states may include, but are not limited to, two positive signals and an AND gate or two negative signals and a NOR gate.

In the depicted embodiment, a first input signal is received at AND gate 58 that indicates the active power 28 ($P_G$) is less than a reverse active power flow or threshold of the reverse active power 54 ($P_{REV}$). A second input signal at AND gate 58 indicates closed turbine valves 56. If both of these input signal conditions are true, then the output of the AND gate 58 is also true (e.g., logical 1). As such, an output indicating that both these input signals exist may indicate a breaker failure and that the generator 14 may start to function as an induction motor. Thus, a trip command may be issued.

After the output signal of the AND gate 58 is true and the generator 14 operates as an induction motor for a time period above a threshold time of timer 60, a trip command 62 (e.g., backup trip command) may be issued (e.g., manually by an operator or automatically by the controller 38) to the generator circuit breaker 22 and the field circuit breaker 16 simultaneously. Although the timer 60 is shown in FIGS. 3 and 4 with a time of 1 second, the threshold for time may be any amount of time for which the motoring condition is permissible (e.g., 2 seconds, 5 seconds, or 10 seconds) for the particular turbine system without causing damage and/or resulting in excessive costs. After the trip command 62 is issued, both the generator circuit breaker 22 and the field circuit breaker 16 may open substantially simultaneously to ensure that the generator 14 is isolated from any power grid.

In this manner, the generator 14 may no longer pull power and may stop operating as an induction motor.

This tripping scheme, by opening both the generator circuit breaker 22 and the field circuit breaker 16, may reduce over-speeding of the turbine generator 14. Specifically, the field circuit breaker 16 is tripped to ensure that the generator 14 does not enter a saturated state. However, a decrease in speed and reactive power rejection when the field circuit breaker 16 is tripped alone may over flux the generator 14, potentially causing damage to the generator 14. As such, both the generator circuit breaker 22 and the field circuit breaker 16 are opened.

On the other hand, if either one of the input signals are not detected (e.g., logical 0), then the output from the AND gate 58 may be false (e.g., logical 0). As such, a normal sequential tripping operation may take place. Sequential tripping may involve a sequence of steps to perform a controlled shutdown. The steps may include ramping down the active power and reactive power outputs down to zero prior to tripping turbine generator 14 (e.g., via an original trip command).

However, in some instances, a connection for at least one phase of the generator 14 (e.g., one of a 3-phase generator) may not open upon the original trip command, indicating that the generator circuit breaker 22 has not completely open. FIG. 4 illustrates a logic diagram for the modified sequential trip operation 50 of FIG. 3 with an additional logic path 70 for breaker failure protection when the generator circuit breaker 22 contacts may not be completely opened. For example, contacts of one or more phases of the generator circuit breaker 22 may not be completely open or disconnected. In general, the modified sequential tripping operation 50 (indicated by a dashed line box) may include the active power 28 ($P_G$), the reverse active power 54 ($P_{REV}$), the AND gate 58A, the timer 60A, the generator circuit breaker 22, and the field circuit breaker 16, and may function as discussed in FIG. 3.

If the generator circuit breaker 22 does not open upon command, the generator 14 may transition from a synchronous motor to an induction motor by absorbing reactive power equal to $V_T^2/X_d$, where $V_T$ is the generator terminal voltage and where $X_d$ is the direct axis synchronous reactance. In this manner, the reactive power check, when the reactive power 30 ($Q_G$) is less than a reverse reactive power 55 ($Q_{REV}$) threshold (e.g., (C)$V_T^2/X_d$ or 5-30% of a plate power rating of the generator 14), may allow reliable identification of the breaker failure condition. As shown, the additional logic path 70 (indicated by a solid line box) may detect a third input of the active power 28 ($P_G$) that is less than 0 W. When both the active power 28 is less than 0 W and turbine valves are closed 56, the output of the AND gate 58B may be true (e.g., logical 1).

The true output signal of 58B and a signal indicating the result of the reactive power 30 being less than the reverse reactive power 55, may result in a true output signal at AND gate 58C. Although the following discussions describe the quotient of $V_T^2/X_d$ multiplied with a coefficient of 0.3, which represents a particular embodiment, it should be noted that the coefficient may be any other suitable coefficient (e.g., 0.2, 0.4, 0.1, and so forth) that prevents damage and/or excessive costs for the particular turbine system operating with a fault condition, such that the reactive power 30 ($Q_G$) being less than the reverse reactive power 55 ($Q_{REV}$) may be calculated by $$Q_G < \left[ C * \frac{V_t^2}{X_d} \right],$$

where C represents the coefficient. For example, the coefficient may be empirically derived. In the example where the coefficient C is 0.3, a signal indicating the result of (0.3) $V_T^2/X_d$ being greater than reactive power 30 may be used as an input to AND gate 58.

Additionally, the output signal from the AND gate 58A indicates that the active power 28 is less than the reverse active power 54 and that the turbine valves are closed 56. The signal indicating the result of the reactive power 30 being less than the reverse reactive power 55 and the output signal from the AND gate 58A may be used as inputs to AND gate 58D. When both of these conditions are met or are true, the output signal at 58D will also be true and used as an input signal for timer 60B. As shown, the illustrated threshold for timer 60B is 40-100 milliseconds. Although the timer 60B indicates a time of 40-100 milliseconds, which describes a particular embodiment, the threshold of time for timer 60B may be any suitable amount time that is sufficient for the generator circuit breaker 22 to trip by the initial trip command. When the timer reaches the threshold time, indicating that the generator 14 is operating as an induction motor for the threshold time, a re-trip command 74 may be issued.

Moreover, the output of AND gate 58C and the output from AND gate 58D may be used as inputs for an OR gate 72. If either of the outputs for AND gate 58C or AND gate 58D are true, then the output may also indicate that the generator 14 is operating as an induction motor. As such, this true output may be used as an input for timer 60C. The illustrated threshold time for timer 60C is 120-300 milliseconds but may be any other suitable duration. After the generator 14 operates as an induction motor for more than the threshold time, a breaker failure output 76 command may be issued. Thus, the breaker failure schemes described in FIGS. 3 and 4 that use an AND gate 58 with two inputs related to a trip command and a breaker failure indication determined by active power 28 and reactive power 30. These two inputs are used to issue a backup trip when both inputs are true to provide an accurate and reliable indication of the actual breaker status. These breaker failure schemes may be accurate and reliable, even for low current outputs in the generator system after the trip command has been issued and the breaker(s) have not been tripped.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present invention should, therefore, be determined only by the following claims.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed.

The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A generator system, comprising:
   a generator comprising terminals;
   a generator circuit breaker coupled to the terminals and configured to selectively couple and decouple the generator from a power grid;
   a plurality of sensors; and
   a controller configured to receive a plurality of signals from the sensors, wherein the plurality of signals indicate a reverse active power in watts, an active power in watts, or a combination thereof, wherein the controller is configured to operate the generator system, including by:
      determining whether the active power is less than a reverse active power threshold;
      determining whether one or more turbine valves of the generator are closed;
      determining that a breaker failure has occurred based at least in part on the active power being less than the reverse active power threshold wattage and the one or more turbine valves being closed; and
      transmitting a trip command to the generator circuit breaker and a field circuit breaker in response to determining that the breaker failure has occurred, wherein the field circuit breaker is disposed between the generator circuit breaker and before a load that is powered by the generator.

2. The generator system of claim 1, wherein the active power and a reactive power are measured based on a sensor current generated by a current transformer, wherein the sensor current is proportional to current flowing through the current transformer.

3. The generator system of claim 1, wherein the breaker failure indicates that the generator circuit breaker is closed after an initial trip command has failed to open the generator circuit breaker.

4. The generator system of claim 3, wherein the trip command to the generator circuit breaker and the field circuit breaker are transmitted simultaneously.

5. The generator system of claim 1, wherein the controller is configured to:
   determine whether the breaker failure continues for a threshold time; and
   transmit the trip command to the generator circuit breaker and field circuit breaker in response to the breaker failure continuing for the threshold time.

6. The generator system of claim 5, wherein the threshold time is based on a timer set to 1 second.

7. The generator system of claim 1, wherein the plurality of sensors are configured to measure power of the generator at a terminal side of the generator.

8. The generator system of claim 1, wherein the controller is configured to:
   determine whether the active power is less than 0 W;
   in response to the one or more turbine valves being closed and the active power being less than 0 W, determine whether a reactive power ($Q_G$) is less than a reverse reactive power threshold, $$Q_G < \left[C * \frac{V_t^2}{X_d}\right],$$

where C is a coefficient, $V_t^2$ is a terminal voltage for the generator, and $X_d$ is a direct axis synchronous reactance; and
   transmit the trip command to the generator circuit breaker in response to the active power being less than the reverse active power threshold, the one or more turbine valves being closed, the active power being less than 0 W, and the reactive power being less than the reverse reactive power threshold.

9. The generator system of claim 8, wherein the trip command comprises a backup trip command used after a previous trip command has failed to trip the generator circuit breaker, wherein the previous trip command failing to trip the generator circuit breaker results in the breaker failure.

10. The generator system of claim 1, wherein the controller is configured to:
    determine whether an active power is less than 0 W;
    in response to the one or more turbine valves being closed and the active power being less than 0 W, determine whether a reactive power ($Q_G$) is less than a reverse reactive power threshold, $$Q_G < \left[C * \frac{V_t^2}{X_d}\right],$$

where C is a coefficient, $V_t^2$ is a terminal voltage for the generator, and $X_d$ is a direct axis synchronous reactance; and
    transmit the trip command to the generator circuit breaker in response to the active power being less than the reverse active power threshold wattage, the active power being less than 0 W, the one or more turbine valves being closed, and the reactive power being less than the reverse reactive power threshold.

11. The generator system of claim 10, wherein the trip command is transmitted from the controller in response to a low current used to detect the breaker failure, wherein the low current comprises a current less than 10% of a rated current of a current transformer.

12. The generator system of claim 11, wherein the low current continues to power the generator prior to the controller transmitting the trip command.

13. A method for operating a generator in a generator system, the method comprising:
    determining whether an active power in watts associated with the generator is less than a reverse active power threshold wattage associated with the generator;
    determining whether one or more turbine valves of the generator are closed;
    determining that a breaker failure has occurred based at least in part on the active power being less than the reverse active power threshold wattage and the one or more turbine valves being closed;

determining whether the breaker failure continues for a threshold time; and transmitting a trip command to a generator circuit breaker and a field circuit breaker simultaneously in response to determining that the breaker failure has continued for the threshold time.

14. The method of claim 13, the method comprising:
determining whether the active power is less than 0 W;
in response to the one or more turbine valves being closed and the active power being less than 0 W, determining whether a reactive power ($Q_G$) is less than a reverse reactive power threshold, $$Q_G < \left[ C * \frac{V_t^2}{X_d} \right],$$

where C is a coefficient, $Vt^2$ is a terminal voltage for the generator, and $X_d$ is a direct axis synchronous reactance; and transmitting the trip command to the generator circuit breaker in response to the active power being less than the reverse active power threshold wattage, the one or more turbine valves being closed, the active power being less than 0 W, and the reactive power being less than the reverse reactive power threshold.

15. The method of claim 14, wherein the threshold time is based on a timer set to 1 second.

16. The method of claim 13, wherein the method comprises:
determining whether the active power is less than 0 W;
in response to the one or more turbine valves being closed and the active power being less than 0 W, determining whether a reactive power ($Q_G$) is less than a reverse reactive power threshold, $$Q_G < \left[ C * \frac{V_t^2}{X_d} \right],$$

where C is a coefficient, $Vt^2$ is a terminal voltage for the generator, and $X_d$ is a direct axis synchronous reactance; and transmitting a breaker failure output in response to the active power being less than the reverse active power and the one or more turbine valves being closed, and the reactive power being less than the reverse reactive power threshold, or in response to the active power being less than 0 W, the one or more turbine valves being closed, and the reactive power being less than the reverse reactive power threshold.

17. The method of claim 13, wherein the method comprises determining whether the breaker failure continues for a threshold time prior to transmitting the trip command to the generator circuit breaker.

18. The method of claim 17, wherein transmitting the trip command comprises disconnecting the generator circuit breaker and the field circuit breaker from a power grid.

19. A tangible, non-transitory, computer-readable medium storing instructions executable by one or more processors of a generator system, wherein the instructions comprise instructions to cause the one or more processors to:

determine whether an active power of the generator system is less than a reverse active power threshold of the generator system;

determine whether one or more turbine valves of the generator system are closed;

determine whether the active power of the generator system is less than 0 W;

determine that a breaker failure has occurred based at least in part on the active power being less than the reverse active power threshold and the one or more turbine valves being closed;

in response to the one or more turbine valves being closed and the active power being less than 0 W, determine whether a condition of a reactive power ($Q_G$) being less than a reverse reactive power threshold and corresponding to the relationship of the $$Q_G < \left[ C * \frac{V_t^2}{X_d} \right]$$

is satisfied, where C is a coefficient, $Vt^2$ is a terminal voltage for a generator of the generator system, and $X_d$ is a direct axis synchronous reactance; and cause transmission of a trip command to a generator circuit breaker and a field circuit breaker in response to the active power being less than the reverse active power threshold, the one or more turbine valves being closed, and $$Q_G < \left[ C * \frac{V_t^2}{X_d} \right],$$

wherein the generator circuit breaker is configured to selectively couple and decouple the generator from a power grid, and wherein the field circuit breaker is disposed between the generator circuit breaker and before a load.

20. The computer-readable medium of claim 19, wherein the instructions comprise instructions to cause the one or more processors to:

determine an initial trip command sent to the generator circuit breaker;

determine that the breaker failure has occurred after the initial trip command was sent;

determine the breaker failure being associated with a failure condition having a low current, wherein the low current comprises a current less than 10% of a rated current of a current transformer; and in response to the failure condition having low current, determining whether $$Q_G < \left[ C * \frac{V_t^2}{X_d} \right],$$

is performed using the low current.

* * * * *